United States Patent [19]
Richards

[11] 4,350,287
[45] Sep. 21, 1982

[54] REMOTE CONTROL CAR HEATER

[75] Inventor: Kennith E. Richards, Texas City, Tex.

[73] Assignees: Thomas E. Mackey; Donal Haire, both of Texas City, Tex.

[21] Appl. No.: 173,901

[22] Filed: Jul. 29, 1980

[51] Int. Cl.³ .............................................. B60H 1/02
[52] U.S. Cl. ................................ 237/12.3 A; 98/2.08; 165/41; 219/203
[58] Field of Search ............... 237/12.3 A, 12.3 C; 219/202, 203; 98/2.08; 165/41

[56] References Cited

U.S. PATENT DOCUMENTS 3,877,639  4/1975  Wilson et al. .................... 236/51
4,293,759  10/1981  Higgins ...................... 237/12.3 A

*Primary Examiner*—Ronald C. Capossela
*Attorney, Agent, or Firm*—Harvey B. Jacobson

[57] ABSTRACT

A remote transmitter is operative to start an electrical heater disposed in an automobile. The electrical heater operates off a separate electrical system from that normally found in the automobile. Once the automobile engine is started and the heating system of the automobile is operative, a thermostatic switch is actuated which removes power from the electrical heater.

9 Claims, 1 Drawing Figure

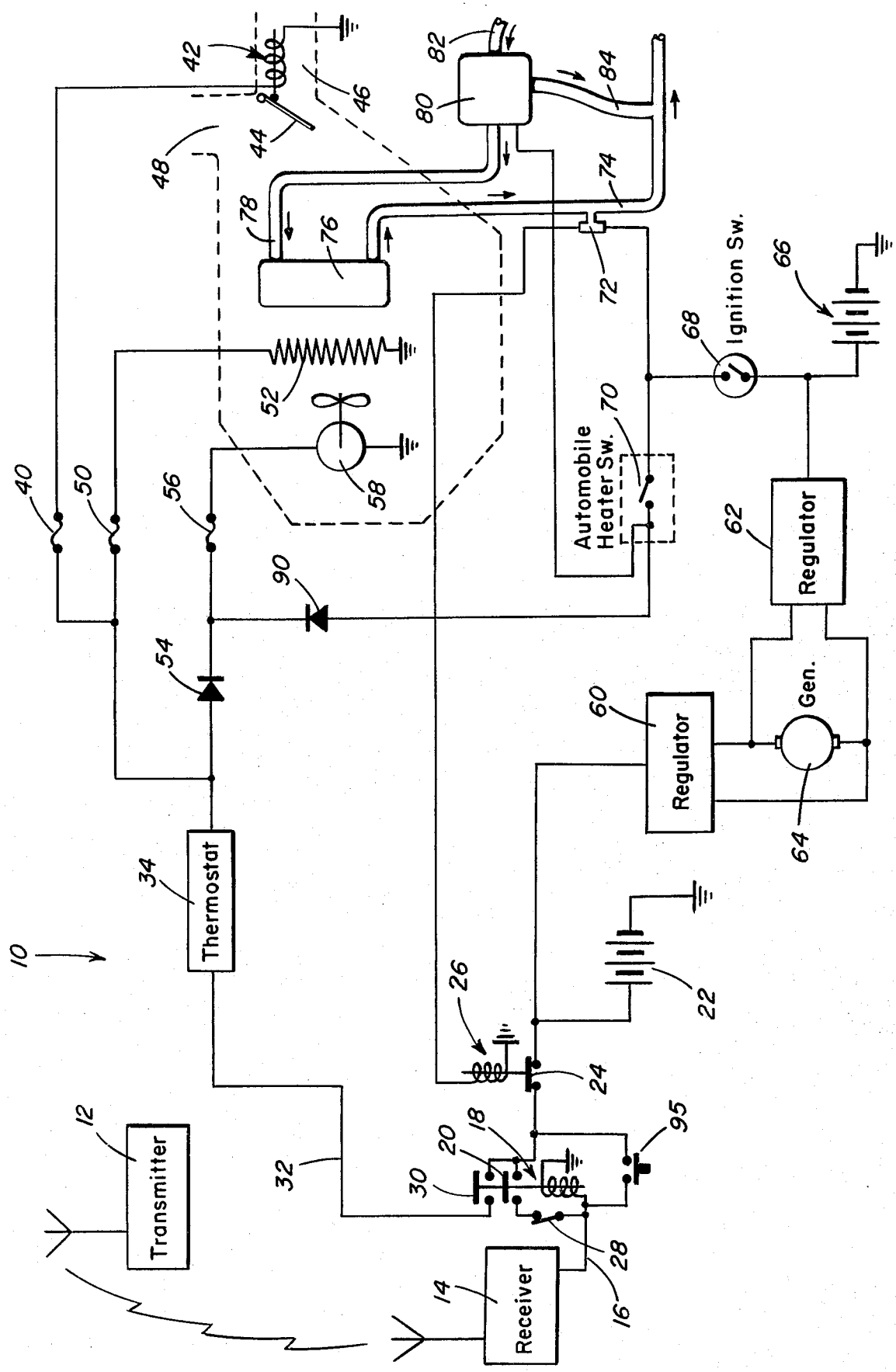

REMOTE CONTROL CAR HEATER

BACKGROUND OF THE INVENTION

This invention relates to automotive heating systems and especially to such systems which can be operated remotely.

DISCUSSION OF RELATED ART

A great deal of physical discomfort is normally associated with the need to enter a cold car on a blustery day in order to commute to work. Persons having heated garages can overcome this discomfort by keeping their cars warm within the confines of the garage. However, the cost of garage construction is very expensive and the cost of keeping the garage heated all night to save a few minutes of discomfort in the morning is prohibitive.

Another alternative to the problem is to leave one's house earlier than usual, start the car to be used and return to the house while the auto warms up. However, such activity is time-consuming and an irritation. Thus, a need has arisen for a simple and effective system for warming the interior of an automobile on mornings when the ambient temperature is quite low.

SUMMARY OF THE INVENTION

One object of the present invention is to provide a heating system for warming the interior of an automobile without the necessity of starting the automobile engine.

Another object of the present invention is to provide a heater system for an automobile which can be actuated remotely in order that the car's interior can be heated by commands from within one's home or other place of warmth.

An even further object of the present invention is to provide an automobile heating system which acts as an auxiliary heat source and is automatically disabled upon the automobile's heating system being operative.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING

The drawing shows a schematic diagram of the remote control car heater of the present invention.

DETAILED DESCRIPTION OF THE PREFERRED EMBODIMENT

Now with reference to the drawing, the remote control car heater system generally referred to by the reference numeral 10 will be described in detail. The system includes a standard transmitter 12, the signal from which is decoded by receiver 14. Transmitter 12 can be any short distance transmitter such as is used with a remote control garage door system. Receiver 14 merely decodes the signal and passes it on through line 16 to the coil of relay 18. Relay 18 has one normally open contactor 20 which, when closed, supplies power from heater battery 22 through normally closed contactor 24 of a second relay 26 and through time delay switch 28 in order to hold the coil of relay 18 in an energized state. A second normally open contactor 30 of relay 18 supplies current through line 32 to thermostat 34. The current through thermostat 34 is supplied through fuse 40 to a relay 42 which, when energized, causes flap 44 to close off duct 46 which is the interior heating duct of the automobile. This leaves duct 48 open, duct 48 being the defroster duct of the automobile. Current is also supplied through a second fuse 50 to electrical resistance heater 52 disposed within the vehicle. Finally, current is supplied to the anode of diode 54 and through that diode through fuse 56 to fan motor 58 of the heating system.

Heater battery 22 can be kept in a charged condition through use of a heater battery regulator 60 which is operated in parallel with the standard automotive regulator 62 from generator or alternator 64. Regulator 62 is connected to automobile battery 66 which, through ignition switch 68 supplies energy to the automobile heater switch 70 and thermostatic switch 72. Thermostatic switch 72 is disposed in the return line 74 from automobile heater radiator 76. A supply line 78 extends from a thermostatic hot water cross-over valve 80 to the heater radiator 76 with an input line 82 connected to the valve 80 from the engine (not shown). A bypass line 84 is connected from valve 80 to the return line 74, which line extends to the automobile engine. Valve 80 is operative to supply water through line 78 to the radiator 76 when the water from the engine is above a predetermined minimum temperature. Otherwise, water is channeled through bypass line 84 to return line 74 to be recirculated to the engine.

Current is supplied through switch 70, when closed, to the valve 80 and to the anode of diode 90. Through diode 90, current is supplied to fan motor 58 to fuse 56.

In operation, a signal transmitted by transmitter 12 is received by receiver 14 and causes a momentary current to be present on line 16 thereby energizing the coil of relay 18. This causes contactors 20 and 30 to close. Contactor 20, being closed, latches the relay on as long as contactor 24 of relay 26 remains closed and time delay switch 28 remains closed. The time delay switch 28 remains closed for a predetermined period which is sufficient to allow the interior of the car to heat up. Thereafter, the switch 28 opens to deenergize the system. With relay 18 energized, current is supplied through thermostat 34 to fan motor 58 and electric resistance heater 52. Thus, air is forced past resistance heater 52 to warm the interior of the car. At the same time, flap 44 is closed by actuation of relay 42 thus durecting the hot air from fan 58 and resistance heater 52 to duct 48 to defrost the windshield of the car as well as heat the interior thereof. If for any reason an overload occurs, one of the fuses 40, 50 or 56 will, of course, blow. This operation will continue with thermostat 34 maintaining the temperature within the vehicle in a comfortable range until the timer of switch 28 times out, thus deenergizing the system.

When the vehicle is entered and the vehicle ignition switch is closed, current is supplied to the thermostat 72. When automobile heater switch 70 is also closed, the valve 80 is actuated and allows hot water to pass to heater radiator 76 after the water reaches a predetermined temperature. The temperature of the water passing through outlet line 74 is sensed by thermostatic switch 72 and causes relay 26 to operate thus opening contactor 24 and deenergizing the electrical resistance heater. At the same time, current is supplied through diode 90 to the fan motor 58 and thus the airflow within the vehicle is maintained with the heat being supplied by radiator 76 rather than resistance heater 52.

A manual momentary contact switch 95 is positioned within the vehicle preferably on the vehicle dashboard and is operative to connect the coil of relay 18 to battery 22 through normally closed contactor 24 when operation of the electrical resistance heater is desired after the operator has entered the vehicle. Thus, the electrical resistance heater may be used to provide initial heating of the vehicle while in motion prior to the time that the engine has warmed up sufficiently to provide heat through radiator 76. With thermostatic switch 72 in the system, the electrical resistance heater will automatically be rendered inoperative when the radiator 76 contains sufficiently warm water to take over the heating operation.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A remote control auxiliary car heater comprising:
   transmitter means for transmitting a start signal;
   receiver means for receiving said transmitted start signal;
   electrical resistance heater means operatively connected to said receiver means for being energized upon receipt of said start signal;
   blower means disposed in operative relation to said electrical resistance means, said blower means energized by being operatively connected to said receiver means for causing airflow over said electrical resistance means upon receipt of said transmitted start signal;
   a thermostat disposed between said receiver means and said electrical resistance heater means for controlling application of energy to said electrical resistance heater means; and
   airflow control means operatively connected to said receiver means for controlling airflow from said blower means and directing said airflow to a windshield of an automobile.

2. The invention as defined in claim 1 and further wherein said auxiliary car heater is disposed in an automobile having an engine, a heater radiator connected to said engine, said heater radiator having an input line and an output line, a thermostatic switch disposed in one of said input and output lines, said switch means being operative upon the temperature in the associated line rising above a predetermined level for the deactivating said electrical resistance heater means.

3. The invention as defined in claim 2 wherein said receiver means is connected to a self-locking relay, said self-locking relay having one contactor connected between a battery and said thermostat for delivering current to said thermostat.

4. The invention as defined in claim 3 and further including a manual momentary contact switch disposed in operative relation to said self-locking relay for actuating said self-locking relay.

5. The invention as defined in claim 4 and further including a second relay having normally closed contacts disposed between said battery and said self-locking relay, said second relay having a coil connected to said thermostatic switch.

6. In an automobile having a heater radiator disposed within the interior of the automobile, a fluid input line connected to said radiator and a fluid output line connected to said radiator forming fluid circuit through the radiator, a blower motor disposed in operative relation to said radiator, and a heater switch connected to said blower motor for causing energization thereof, the improvement comprising an electrical resistance heater disposed in operative relation to said blower motor; a receiver means for receiving a signal transmitted from a remote transmitter unit, said receiver means being connected for energization of said electrical resistance heater; a thermostatic switch means disposed in one of said input and output lines of said heater radiator, said thermostatic switch means being operative to remove energization from said electrical resistance heater upon a temperature value in the associated line rising above a predetermined temperature level.

7. The invention as defined in claim 6 wherein said automobile includes an automobile battery operative through said automobile heater switch to energize said blower motor and further including a heater battery connected to said blower motor for energization of said blower motor.

8. The invention as defined in claim 7 and further including a first diode connected between said automobile battery and said blower motor and a second diode connected between said heater battery and said blower motor.

9. The system as defined in claim 6 and further wherein said automobile includes an automobile interior heating duct and a windshield defrosting duct, a flap disposed for closing off one of said ducts and flap actuation means connected to said receiver causing said flap to close off said vehicle interior heating duct upon actuation of said electrical resistance heater.

* * * * *